United States Patent Office 2,780,535
Patented Feb. 5, 1957

2,780,535

CARBAMYL PSEUDOUREA HERBICIDAL COMPOSITION AND A METHOD FOR KILLING WEEDS THEREWITH

Jack A. Snyder, Wilmington, Del., assignor to E. I. du Pont de Nemours and Company, Wilmington, Del., a corporation of Delaware No Drawing. Application February 18, 1954, Serial No. 411,280

2 Claims. (Cl. 71—2.6)

This invention relates to herbicidal compositions and methods employing an organo carbamyl pseudourea as an essential active ingredient.

The compounds are, as indicated by the name carbamyl pseudourea, characterized by the following structure:

(1)
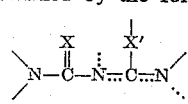

where X and X' are either oxygen or sulphur. The broken lines are used in the Formula 1 in the conventional sense to indicate that the double bond can be between one or the other of the nitrogens and the intermediate carbon. In other words, the compounds have the structure (2)
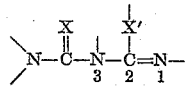

or (3)
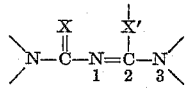

The substituents satisfying the free valences shown in the above formulas can be varied widely, as will be shown below, since it is the carbamyl pseudourea moiety that contributes most significantly to the herbicidal properties of the compounds.

More specifically, the organo carbamyl pseudoureas of the invention are selected from compounds represented by the formulas (4)
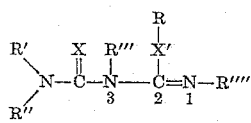

and (5)
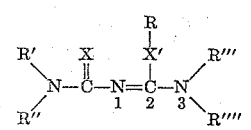

where X and X' are oxygen or sulphur, where R is an organic radical and is preferably lower alkyl or lower alkenyl. R', R'', R''', and R'''' are hydrogen or organic radicals. The term organic radical is meant to include saturated and unsaturated acylic and cyclic aliphatic radicals and aromatic radicals, which radicals may contain various substituents such as chlorine and other halogens, nitro, hydroxy, lower alkoxy, lower alkylmercapto, and the like. Lower alkyl, lower alkenyl, phenyl and substituted phenyl are prefered organic radicals for R', R'', R''', and R''''. Preferably R' is phenyl or substituted phenyl such as mono and polychlorophenyls, tolyl, lower alkoxyphenyl, xylyl, chlorotolyl, nitrophenyl, N,N-disubstituted aminophenyl, lower alkylmercaptophenyl, lower alkylsulfonylphenyl, cyanophenyl and similar commonly substituted phenyl radicals and R'' is hydrogen. Note that whenever "lower" is used of a group herein, the expression in accordance with common practice is intended to cover groups having no more than six carbon atoms.

The organo carbamyl pseudoureas employed in the herbicidal compositions and methods of this invention are suitably prepared in general by reaction of a pseudourea with an organo carbamyl halide. The following equations illustrate typical reactions:

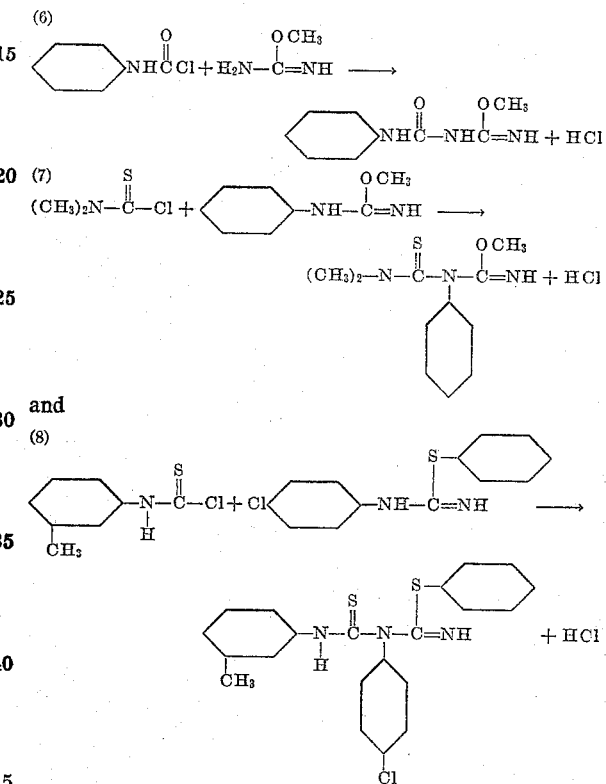

and (8)

The carbamyl halide reactions of the kind illustrated above can conveniently be effected in a solvent for one or both of the reactants. It is preferred that the solvent be one from which the reaction product will separate tho this is not imperative. The reactions are preferably carried out in an inert solvent such as xylene, toluene, dioxane, chloroform, diethyl ether, tetrahydrofuran, methylene chloride. Water can also be used as the reaction medium where the carbamyl chloride is not rapidly decomposed by water. Ordinarily it is preferable to have an acid acceptor present. Common acid acceptors such as sodium hydroxide, triethyl amine, pyridine, and the like are suitable; the pseudourea reactant if used in excess will also serve as an acid acceptor.

In those cases where R'', of Formulas 4 and 5 above, is to be hydrogen, the organo carbamyl pseudoureas are conveniently prepared by reaction of an organo isocyanate or isothiocyanate with the pseudourea reactant. This process of preparation is illustrated by Curd et al., J. Chem. Soc. (1949) 1732–9. The following equation illustrates the reaction:

(9)

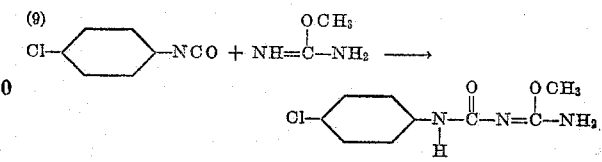

Herbicidal compositions of the invention are prepared by admixing one or more of the organo carbamyl pseudoureas defined heretofore, in herbicidally effective amounts, with a conditioning agent of the kind used and referred to in the art as a pest control adjuvant or modifier to provide formulations adapted for ready and efficient application to soil or weeds (i. e., unwanted plants), using conventional applicator equipment.

Thus the herbicidal compositions or formulations are prepared in the form of solids or liquids. Solid compositions are preferably in the form of dusts and are compounded to give homogeneous free-flowing dusts by admixing the active compound or compounds with finely divided solids preferably talcs, natural clays, pyrophyllite, diatomaceous earth or flours such as walnut shell, wheat, redwood, soya bean, cottonseed flours and other inert solid conditioning agents or carriers of the kind conventionally employed in preparing pest control compositions in dusts or powdered form.

Liquid compositions of the invention are prepared in the usual way by admixing one or more of the organo carbamyl pseudoureas with a suitable liquid diluent media. With certain solvents such as alkylated naphthalene, dimethylformamide, and cresol, relatively high, up to about 35% by weight or more, concentrations of the organo carbamyl pseudoureas can be obtained in solution. Other liquids conventionally used in preparing liquid herbicidal compositions are for the most part less effective solvents.

The herbicidal compositions of the invention whether in the form of dusts or liquids preferably also include a surface-active agent of the kind sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitutes a desirable composition for application.

The surface-active dispersing agents employed can be of the anionic, cationic, or nonionic type and include, for example, sodium and potassium oleate, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene/carbon monoxide polymers, laurylamine hydrochloride, laurylpyridinium bromide, stearyl-trimethylammonium bromide, cetyl-dimethylbenzyl ammonium chloride, lauryldimethylamine oxide, and the like. Generally, the surface-active agent will not comprise more than about 5 to 15% by weight of the composition, and in certain compositions the percentage will be 1% or less. Usually the minimum lower concentration will be 0.1%.

The herbicidal compositions are applied either as a spray or a dust to the locus or area to be protected from undesirable plant growth, commonly called weeds, i. e., plants growing where they are not wanted. Such application can be made directly upon the locus or area and the weeds thereon during the period of weed infestation in order to destroy the weeds, but preferably, the application is made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

The active compound is, of course, applied in amount sufficient to exert the desired herbicidal action. The amount of the active compound present in the compositions as actually applied for destroying or preventing weeds will vary with the manner of application, the particular weeds for which control is sought, the purpose for which the application is being made, and like variables. In general, the herbicidal compositions as applied in the form of a spray or a dust will contain from about 0.5% to 85% by weight of organo carbamyl pseudoureas.

Fertilizer materials, other herbicidal agents, and other pest control agents such as insecticides and fungicides can be included in the herbicidal compositions of the invention if desired.

In order that the invention may be better understood, the following examples are given in addition to the examples already given above.

EXAMPLE 1

3.72 parts by weight of 2-methylpseudourea hydrochloride is dissolved in 25 parts by weight of 10% aqueous potassium hydroxide at a temperature of about 10° C. There is added to this mixture 5.5 parts by weight of p-chlorophenyl isocyanate. The reactant mixture is agitated for about 20 minutes while maintaining the temperature at approximately 5 to 10° C.

The product is recovered from the reaction mass by extraction with two portions of diethyl ether. In the first extraction, about 100 parts by weight of diethyl ether is used, and in the second, approximately 35 parts by weight. The ether extracts are combined, washed with water, and dried.

After drying the extract, it is concentrated in vacuo to about 10 parts by weight, then filtered. The filtrate is then further concentrated in vacum to dryness. The solid product remaining is recrystallized from methanol-water. There is obtained 1-(p-chlorocarbanilyl)-2-methylpseudourea having a melting point of 116–118° C.

*Analysis.*—Calc'd for $C_9H_{10}ClN_3O_2$: C, 47.5; H, 4.43. Found: C, 48.2; H, 4.47.

The herbicidal properties of the organo carbamyl pseudoureas are illustrated by the results obtained from application of an aqueous spray containing as the active ingredient only 1% of the compound prepared as described above in this example. Johnson grass and tomato plants thus treated wilted quite rapidly and were dead when observed 19 days after treatment. In other evaluations, the compound was found to be effective in pre-emergence application for the control of broad leaf weeds and grasses.

EXAMPLE 2

*Dust formulations*

The following compositions are adapted for direct application as dusts for the destruction or prevention of weeds using conventional dusting equipment. The dusts are made by blending or mixing the ingredients and grinding the mix to give compositions having an average particle size less than about 50 microns.

A

| | |
|---|---|
| 1-(p-chlorocarbanilyl)-2,3-dimethylpseudourea | 20 |
| Talc | 80 |
| | 100 |

B

| | |
|---|---|
| 1-(3,4-dichlorocarbanilyl)-2-methylpseudourea | 5 |
| Cottonseed oil | 4 |
| Walnut shell flour | 91 |
| | 100 |

EXAMPLE 3

*Water-dispersible powders*

The following powdered compositions are adapted for dispersing in water for application as a spray for the destruction and prevention of weeds. The powdered compositions are made by intimately mixing the listed ingredients using conventional mixing or blending equipment and then grinding the mixture to give a powder having an average particle size less than about 50 microns.

A

| | |
|---|---|
| 1-(p-methylcarbanilyl)-2-methylpseudourea | 75 |
| Fuller's earth | 23.75 |
| Sodium lauryl sulfate, 50% (wetting agent) | 1 |
| Methyl cellulose, 15 cps. (dispersing agent) | 0.25 |
| | 100 |

B

| | |
|---|---|
| 1-(p-chlorocarbanilyl)-2-methyl-3-phenylpseudourea | 80 |
| Sodium disulfonate of dibutyl phenylphenol (wetting and dispersing agent) | 2 |
| Bentonite | 18 |
| | 100 |

EXAMPLE 4

Oil-water dispersible powders

The following powdered compositions are adapted for use in the preparation of spray compositions using either an oil, water, or a combination of oil and water as the liquid diluent. The powders are made by mixing and grinding as in the case of the powders of Example 2.

A

| | |
|---|---|
| 1-(p-chlorocarbanilyl)-2-ethylpseudourea | 70 |
| Alkylated aryl polyether alcohol (wetting and dispersing agent) | 4 |
| Fuller's earth | 26 |
| | 100 |

B

| | |
|---|---|
| 3-(m-methylcarbanilyl)-2-methylpseudourea | 80 |
| Ethylene oxide stearate-laurate (emulsifying agent) | 4 |
| Pyrophyllite | 16 |
| | 100 |

EXAMPLE 5

Water-dispersible liquid compositions

The following compositions are in a liquid form and are adapted for addition to water to give aqueous dispersions for application as sprays. In the case of some organo carbamyl pseudoureas, the compositions will not be complete solutions but rather will be in part dispersions of solid in an oil. The liquid or fluid compositions shown are prepared by thoroughly mixing or dispersing the active compounds and conditioning agent or agents in an organic liquid diluent.

A

| | |
|---|---|
| 3-(p-chlorocarbanilyl)-1,2-dimethylpseudourea | 25 |
| Long chain fatty alcohol sulfate (emulsifying agent) | 2 |
| Goulac (dispersing agent) | 3 |
| Kerosene | 70 |
| | 100 |

B

| | |
|---|---|
| 3-(3,4-dichlorocarbanilyl)-2-methylpseudourea | 30 |
| Alkylated aryl polyether alcohol (wetting and emulsifying agent) | 3 |
| Methyl cellulose (dispersing agent) | 1 |
| Kerosene | 66 |
| | 100 |

EXAMPLE 6

Granular compositions

The following compositions are adapted for application by a means of a fertilizer spreader apparatus or similar equipment. The compositions are readily prepared by mixing the ingredients with water to form a paste. The paste is then extruded, dried, and ground to give the desired granular size. Preferably, the granules will be in the order of one thirty-second to one-quarter inch diameter.

A

| | |
|---|---|
| 3-(p-chlorocarbanilyl)-2-ethylpseudourea | 10 |
| Goulac (dispersing agent) | 3 |
| Hydrocarbon oil | 1 |
| Dextrin (binding agent) | 20 |
| Fuller's earth | 66 |
| | 100 |

B

| | |
|---|---|
| 3-(p-chlorocarbanilyl)-2-ethylpseudourea | 7 |
| Goulac | 3 |
| Refined kerosene | 1 |
| Gelatin | 25 |
| Talc | 64 |
| | 100 |

The following compounds are given as further examples of organo carbamyl pseudoureas employed in the compositions and methods of the invention and it will be understood that such compounds can be used in place of the various compounds specifically shown in the foregoing detailed examples. It should be noted that in the nomenclature used heretofore and in the following tabulation of compounds the numbering of substituents on the pseudourea structure is in accordance with the numbering shown on the skeletal Formulas 2 and 3 given hereinabove; in other words, the nitrogen linked to the ureido carbon by a double bond is number 1, the other nitrogen number 3, and the ureido carbon is number 2.

1. 1-(p-chlorocarbanilyl)-2-methylpseudourea
2. 1-(N-methyl-p-chlorocarbanilyl)-2methylpseudourea
3. 1-(N-phenyl-p-chlorocarbanilyl)-2-methylpseudourea
4. 1-(N-methylcarbamyl)-2-methylpseudourea
5. 1-carbanilyl-2-methylpseudourea
6. 1-(p-chlorocarbanilyl)-2-(1-propyl)pseudourea
7. 1-(p-chlorocarbanilyl)-2-(2-propyl)pseudourea
8. 1-(p-chlorocarbanilyl)-2-(1-butyl)pseudourea
9. 1-(-p-chlorocarbanilyl)-2-allylpseudourea
10. 1-(p-chlorocarbanilyl)-2-phenylpseudourea
11. 1-(p-chlorocarbanilyl)-2-methyl-2-thiopseudourea
12. 1-(p-chlorothiocarbanilyl)-2-methylpseudourea
13. 1-(p-chlorothiocarbanilyl)-2-methyl-2-thiopseudourea
14. 3-(p-chlorocarbanilyl)-2-methylpseudourea
15. 3-(p-chlorocarbanilyl)-2-methyl-1-phenylpseudourea
16. 3-(p-chlorocarbanilyl)-2,3-dimethylpseudourea
17. 3-(p-chlorocarbanilyl)-2-methyl-3-phenylpseudourea
18. 3-(N-methyl-p-chlorocarbanilyl)-2-methylpseudourea
19. 3-(N-phenyl-p-chlorocarbanilyl)-2-methylpseudourea
20. 3-(N-methylcarbamyl)-2-methylpseudourea
21. 3-carbanilyl-2-methylpseudourea
22. 3-(p-chlorocarbanilyl)-2-(1-propyl)pseudourea
23. 3-(p-chlorocarbanilyl)-2-(2-propyl)pseudourea
24. 3-(p-chlorocarbanilyl)-2-(1-butyl)pseudourea
25. 3-(p-chlorocarbanilyl)-2-phenylpseudourea
26. 3-(p-chlorothiocarbanilyl)-2-methylpseudourea
27. 3-(p-chlorocarbanilyl)-2-methyl-2-thiopseudourea
28. 3-(p-chlorothiocarbanilyl)-2-methyl-2-thiopseudourea
29. 1-(N-allylcarbamyl)-2-methylpseudourea
30. 1-(N-ethylcarbamyl)-2-methylpseudourea
31. 1-(N-hexylcarbamyl)-2-methylpseudourea
32. 1-(N-trichloromethylcarbamyl)-2-methylpseudourea
33. 1-(N-alpha-naphthylcarbamyl)-2-methylpseudourea
34. 1-(N-cyclohexylcarbamyl)-2-methylpseudourea 35. 1-(N-methoxymethylcarbamyl)-2-methylpseudourea
36. 1-(p-methylmercaptocarbanilyl)-2-methylpseudourea
37. 1-(p-methylsufonylcarbanilyl)-2-methylpseudourea
38. 1-(m-nitrocarbanilyl)-2-methylpseudourea
39. 1-(m-aminocarbanilyl)-2-methylpseudourea
40. 1-(p-methoxycarbanilyl)-2-methylpseudourea
41. 1-(3-methyl-4-chlorocarbanilyl)-2-methylpseudourea
42. 1-[di-(p-chlorophenyl)carbamyl] - 2 - methylpseudourea
43. 1-(3,4-dichlorocarbanilyl)-2,3-dimethylpseudourea
44. 1-(3,4 - dichlorocarbanilyl)-2-methyl-3-phenylpseudourea
45. 1-(3,4 - dichlorocarbanilyl)-3-chlorophenyl-2-methylpseudourea
46. 1-(3,4-dichlorocarbanilyl)-3-cyclohexyl - 2 - methylpseudourea
47. 1-(3,4 - dichlorocarbanilyl) - 2 - methyl-3-(p-tolyl)-pseudourea
48. 1-(3,4-dichlorocarbanilyl)-2,3,3-trimethylpseudourea
49. 1-(3,4-dichlorocarbanilyl)-3,3-di-(1 - butyl)-2-methylpseudourea
50. 1 - (3,4 - dichlorocarbanilyl) - 3 - allyl-3-(p-chlorophenyl)-2-methylpseudourea
51. 1-(3,4-dichlorocarbanilyl) - 2 - methyl-3-di-(p-chlorophenyl)pseudourea
52. 1 - (N - cyclohexylcarbamyl) - 2,3,3 - tricyclohexylpseudourea
53. 1-[di - (p - chlorophenyl)carbamyl]-2,3,3-trimethylpseudourea
54. 3-(N-allylcarbamyl)-2-methylpseudourea
55. 3-(N-ethylcarbamyl)-2-methylpseudourea
56. 3-(N-hexylcarbamyl)-2-methylpseudourea
57. 3-[N-(β-chloroethyl)carbamyl]-2-methylpseudourea
58. 3-(N-alpha-naphthylcarbamyl)-2-methylpseudourea
59. 3-(N-cyclohexylcarbamyl)-2-methylpseudourea
60. 3-[N - (β - methoxyethyl)carbamyl]-2-methylpseudourea
61. 3-(p-methylmercaptocarbanilyl)-2-methylpseudourea
62. 3-(p-methylsulfonylcarbanilyl)-2-methylpseudourea
63. 3-(m-nitrocarbanilyl)-2-methylpseudourea
64. 3-(m-aminocarbanilyl)-2-ethylpseudourea
65. 3-(p-methoxycarbanilyl)-2-methylpseudourea
66. 3-(3,4-dimethylcarbanilyl)-2-methylpseudourea
67. 3-(4-methyl-3-chlorocarbanilyl)-2-methylpseudourea
68. 3-[di-(p-chlorophenyl)carbamyl] - 2 - methylpseudourea
69. 3-(3,4-dichlorocarbanilyl)-2,3-dimethylpseudourea
70. 3-(3,4 - dichlorocarbanilyl) - 2 - methyl - 3 - phenylpseudourea
71. 3-(3,4 - dichlorocarbanilyl) - 3 - (p - chlorophenyl)-2-methylpseudourea
72. 3-(3,4 - dichlorocarbanilyl) - 3 - cyclohexyl-2-methylpseudourea
73. 3-(3,4-dichlorocarbanilyl)-2-methyl - 3 - (p - tolyl)-pseudourea
74. 3-(3,4-dichlorocarbanilyl)-1,2,3-trimethylpseudourea
75. 3-(3,4 - dichlorocarbanilyl) - 1,3 - di - (1 - butyl)-2-methylpseudourea
76. 3-(3,4 - dichlorocarbanilyl) - 1 - allyl - 3 - (p-chlorophenyl)-2-methylpseudourea
77. 3-(3,4-dichlorocarbanilyl)-1,3-di-(p - chlorophenyl)-2-methylpseudourea
78. 3 - (N - cyclohexylcarbamyl) - 1,2,3 - tricyclohexylpseudourea
79. 3-[di-(p-chlorophenyl)carbamyl] - 1,2,3 - trimethylpseudourea
80. 3-(2,4-dichlorocarbanilyl)-2-allylpseudourea
81. 3-(2,4,5-trichlorocarbanilyl)-2-methylpseudourea
82. 3-(p-bromocarbanilyl)-2-methylpseudourea
83. 3-(m-chlorocarbanilyl)-2-methylpseudourea
84. 3-(o-chlorocarbanilyl)-2-methylpseudourea
85. 3-(p-butoxycarbanilyl)-2-methylpseudourea
86. 3-(p-hexylcarbanilyl)-2-methylpseudourea
87. 3-(3-chloro - 4 - methoxycarbanilyl)-2-methylpseudourea
88. 3-(N,N-dimethycarbamyl)-2-methylpseudourea
89. 3-(N,N-dibutyicarbamyl)-2-methylpseudourea
90. 3-(N-dodecylcarbamyl)-2-methylpseudourea
91. 3-(p-chlorocarbanilyl) - 2 - (β-hydroxyethyl)pseudourea
92. 3-(N,N-diallylcarbamyl)-2-allylpseudourea
93. 3-carbamyl-2-methylpseudourea
94. 3-(p - chlorocarbanilyl) - 2,3 - dimethyl - 1 - phenylpseudourea
95. 3-(N-benzylcarbamyl)-2-methylpseudourea Those skilled in the art will appreciate that other organo carbamyl pseudoureas can be prepared and employed in the compositions and methods of the invention. Thus the foregoing detailed description has been given for clearness of understanding only and no unnecessary limitations are to be understood therefrom.

I claim:

1. A method for the control of weeds which comprises applying to a locus to be protected, in amount sufficient to exert a herbicidal action, an organo carbamyl pseudourea selected from the group consisting of compounds represented by the formulas

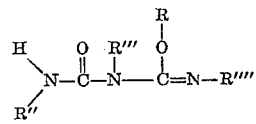

and

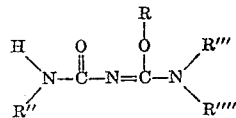

where R is from the group consisting of substituted and unsubstituted alkyl and alkenyl organic radicals of 1 to 4 carbons, R'' is from the group consisting of phenyl and substituted phenyl, and R''' and R'''' are from the group consisting of hydrogen and substituted and unsubstituted alkyl and alkenyl organic radicals of 1 to 6 carbons.

2. A herbicidal composition comprising a material selected from the group consisting of anionic, cationic and nonionic organic surface-active dispersing agents and, in amount sufficient to exert herbicidal action, an organo carbamyl pseudourea selected from the group consisting of compounds represented by the formulas

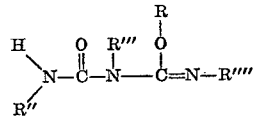

and

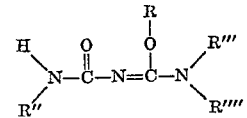

where R is from the group consisting of substituted and unsubstituted alkyl and alkenyl organic radicals of 1 to 4 carbons, R'' is from the group consisting of phenyl and substituted phenyl, and R''' and R'''' are from the group consisting of hydrogen and substituted and unsubstituted alkyl and alkenyl organic radicals of 1 to 6 carbons.

References Cited in the file of this patent

UNITED STATES PATENTS

| | | |
|---|---|---|
| 2,336,868 | Joyne et al. | Dec. 14, 1943 |
| 2,345,109 | Groenacker | Mar. 28, 1944 |
| 2,547,366 | Bock et al. | Apr. 3, 1951 |

(Other references on following page)

OTHER REFERENCES

Basterfield et al.: "Acyl Iso-Ureas," J. A. C. S., vol. 49, December 1927, pages 3177 to 3180 incl.

Basterfield et al. (B): "Studies in Iso-Ureas and Iso-Ureides," Canadian Journal of Research, vol. 1, No. 4, 1929, pages 285 to 291 inclusive.

Dieke et al.: "The Acute Toxicity of Thioureas and Related Compounds to Wild and Domestic Norway Rats," Journal of Pharmacology, vol. 90, 1947, pages 260 to 270 inclusive.

Curd et al. in Chemical Abstracts, vol. 44, 1950, pages 7848 (c) to 7852 (d).